United States Patent [19]
Brandenstein

[11] 3,741,361
[45] June 26, 1973

[54] CLUTCH RELEASE BEARING

[75] Inventor: Manfred Brandenstein, Aschfeld, Germany

[73] Assignee: SKF Kugellagerfabriken GmbH, Schweinfurt, Germany

[22] Filed: Sept. 28, 1971

[21] Appl. No.: 184,467

[30] Foreign Application Priority Data
Oct. 2, 1970   Germany................... P 70 36 423.7

[52] U.S. Cl................ 192/110 B, 192/98, 308/236
[51] Int. Cl........................................... F16d 13/60
[58] Field of Search.................... 192/110 B, 98; 308/236, 194

[56] References Cited
UNITED STATES PATENTS
1,431,551   10/1922   White................................. 192/98

FOREIGN PATENTS OR APPLICATIONS
400,905     8/1924   Germany........................... 192/110
474,112    10/1937   Great Britain..................... 192/110
531,046    12/1940   Great Britain......................... 192/98
1,550,862  10/1969   Germany............................... 192/98

Primary Examiner—Charles J. Myhre
Assistant Examiner—Randall Heald
Attorney—Richard Low and Murray Schaffer

[57] ABSTRACT

A clutch release bearing comprising an outer race ring adapted to be connected to the clutch operating mechanism, an inner race ring and a plurality of bearing elements located therebetween. The bearing includes engagement means abutting the inner race ring and adapted to contact the clutch elements. The abutting surfaces of the race ring and the engagement means are correspondingly curved to permit relative movement therebetween.

12 Claims, 4 Drawing Figures

INVENTOR.
MANFRED BRANENSTEIN

CLUTCH RELEASE BEARING

BACKGROUND OF INVENTION

The present invention relates to clutch release bearings.

Release bearings are conventionally employed in automotive clutches to transmit power from the operating fork or similar mechanism to the clutch release elements such as the toggle levers, the diaphragm springs, or the like which cooperate with the clutch pressure plate. Generally, such bearings consist of an outer bearing ring having fastened thereto a cap, a sleeve or the like which is engaged by the clutch release fork and an inner bearing ring between which the roller elements are located. The inner ring of the conventional bearings has an engagement face adapted to contact the clutch release elements, which face lies at right angles to the bearing axis. The clutch release elements may comprise levers, coupling elements such as an adjusting sleeve or the inner tongue shape elements of a diaphragm spring or the like. Because of these designs, eccentric movement or gyrating motion of the clutch can not be easily or effectively compensated and the bearing or clutch suffer from premature wear.

An object of the present invention is to provide a clutch release bearing which overcomes the defects of the prior art devices and which can compensate for the eccentric or gyrating motion of the clutch.

A further object of this invention is to provide a clutch release bearing which is self-centering and accomodates for swinging of the clutch.

Still another object of the present invention is to provide a clutch release bearing having a relatively small axial dimension.

Further objects and advantages of the present invention will be apparent from the following disclosure.

SUMMARY OF THE INVENTION

According to the present invention a clutch release bearing is provided for interposition between the clutch elements and the clutch release operating mechanism comprising an outer race ring adapted to be connected to the clutch operating mechanism, an inner race ring and a plurality of bearing elements located therebetween. The bearing includes engagement means abutting the inner race ring and adapted to contact the clutch elements. The abutting surfaces of the race ring and the engagement means are correspondingly curved to permit relative movement therebetween. This construction permits the bearing to be self-centered and to compensate for any gyrating movement of the clutch.

Preferrably the engagement means comprises a disc having a spherical convex face seated within a correspondingly convex portion of the inner ring, the curvature of radius being the same for each face.

The inner ring is provided with at least one step member parallel to the axis of the bearing and overlying at least a portion of the engaging means. The outer ring is substantially U-shaped and the inner ring is set within it. These arrangements substantially shorten the axial dimension of the bearing.

The bearing is provided with a cap having projections for attachment with a fork or other operating mechanism, sealing means, and cover means for holding the bearing together.

Full details of the present invention are set forth in the following disclosure and in the accopanying drawings.

DESCRIPTION OF INVENTION

Figure 1:
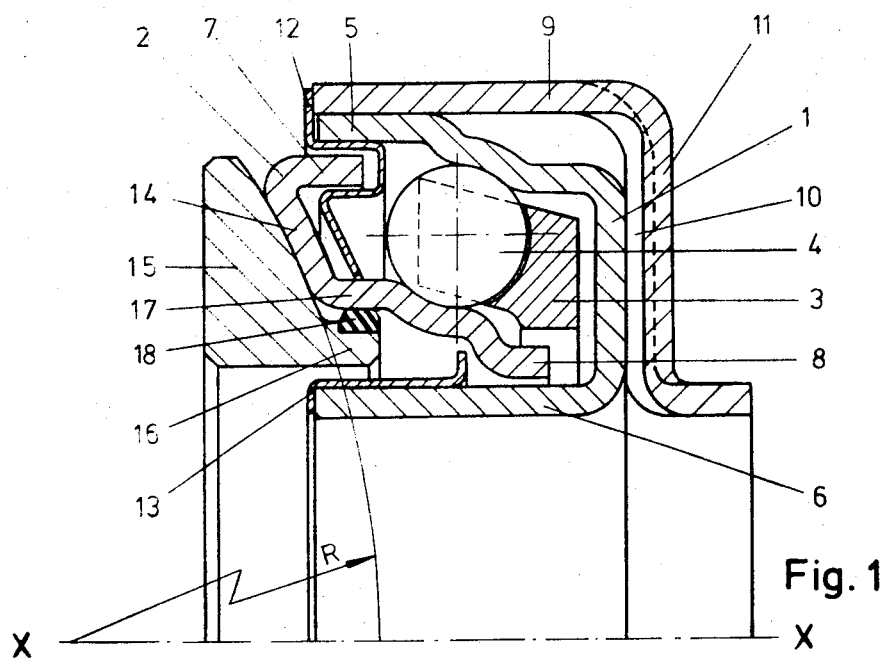
FIGS. 1 through 4 are sectional views through the bearing axis showing various embodiments of the present invention.

In the embodiment seen in FIG. 1, the bearing comprises an outer ring 1, and an inner ring 2 each having suitable race surfaces between which a cage 3 holding a plurality of antifriction elements such as roller balls are located. Both the inner ring 2 and the outer ring 1 are substantially U-shaped in cross section, each having leg portions 5,6 and 7,8 respectively. The leg portions 5,6,7 and 8 lie substantially parallel to the rotational axis $x - x$ of the bearing. The inner leg 6 of the outer ring forms at least in part the bearing sleeve adapted to fit over the main drive pinion. The inner ring is annularly smaller than the outer ring so that it fits telescopingly within the bight of the outer ring without touching the outer ring and with their legs arranged directly opposite to each other so that their outer faces provide an enclosure for the rollers.

The outer ring 1 is enveloped by a z-shaped cap 9 fastened to it and having an upper arm secured to the leg 5 of the outer ring, a lower arm extending outwardly away from the bearing forming also a portion of the sleeve and a radially directed central section 10 in whose outer face there are provided a plurality of spoke-like projections 11.

The bearing is adapted to be arranged in a clutch assembly about the transmission pinion with its rear end in connection with the clutch release operating mechanism. The operating mechanism such as a fork is adapted to cooperatingly engage the projections 11. The front end of the bearing is directed toward the clutch itself. The entire clutch mechanism except for the present bearing is conventional in structure and operation and so does not require illustration here.

Arranged between the leg 7 of the inner ring 2 and the leg 5 of the outer ring 1 so as to seperate the two, is a protective cover 12. The cover 12 is offset several times in a tortuous or labyrinth manner at right angles so as to sealingly fit between the legs 5 and 7. The leg 7 cooperates with the cover 12 to seal the interior of the bearing while permitting relative movement of the rings 1 and 2. To also facilitate the holding of the bearing during assembly and for sealing the central bore of the bearing a second pretective annular z-shaped cover 13 is slip-fitted over the lower leg 6 of the outer ring 1.

The inner ring 2 has a central section 14 the outer face of which is concavely shaped and directed toward the clutch. This outer face is curved at a radius R and abuts against a correspondingly convexedly shaped spherical face of an annular dome-like clutch release disk 15 adapted to be arranged substantially coaxially along the bearing axis. The convexedly shaped face of the disk 15 has the same radius R as the concave face of the section 14 of the inner ring. The release disk 15 has an axially directed annular hub 16 extending inwardly of the bearing, which underlies an axially directed offset land or stepped portion 17 lying between the lower leg 8 and the central section 14 of the inner ring 2. The value of the radius R increases with the radial dimension of the bearing and depends on the particular application; it must be determined by way of construction. The disk 15 has a flat outer face adapted to engage the lever, spring etc., of the clutch mechanism. The hub 16 and the offset land portion 17 axially overlap and are separated from each other by an elastomeric sealing ring 18. The elastomeric ring 18 may be rubber, plastic or other resilient material and is adapted to compensate for relative movement between the inner ring 2 and the release disk 15. The elastomeric seal 18 may be set in a slot or groove in the release disk 15 or glued or otherwise secured to either or both parts.

The benefits and advantages of the present invention arise in large measure out of the arrangement and shape of the clutch release disk 15 and its corresponding seat within the concave face of the central section 14 of the inner ring 2. Because of the spherical surface of its dome-like face with which it abuts against the inner ring, it is angularly moveable, with respect to the bearing axis X—X so that any gyrating movement of the clutch can be absorbed and thus compensated for without transmission to the rotating bearing itself. Moreover, the bearing is self-centering even at high speeds. Misalignments relative to the clutch axis (which is co-axial with the bearing axis) are easily compensated.

Figure 2:
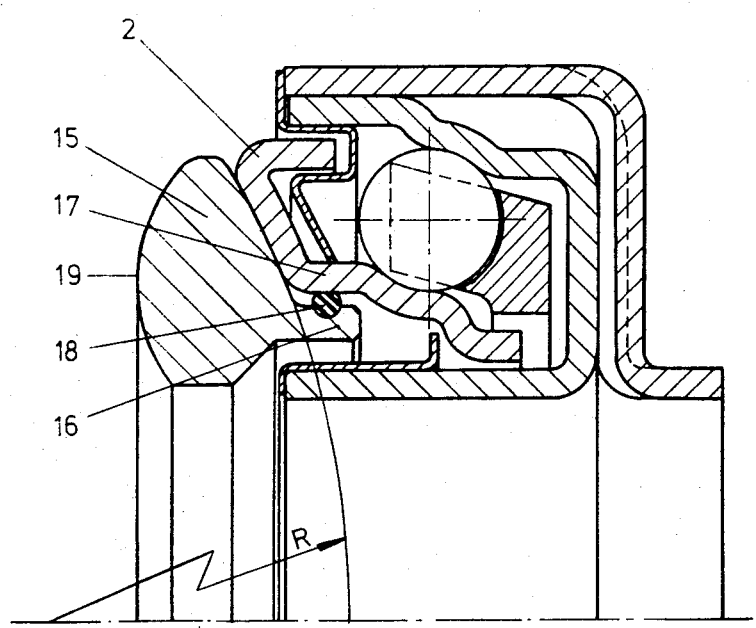

In FIG. 2 a basically similar design is shown. This bearing differs from that of FIG. 1 only insofar as the outer or clutch element (lever, diaphragm, spring) engaging face of the release disk 15 is concerned. Whereas the engaging face of the release disk 15 seen in FIG. 1 is flat, the face 19 in FIG. 2 is bulging and is provided with a convex or arcuate shape. The bulging engaging face 19 is of advantage when the corresponding contact face of the clutch coupling are themselves flat or planar. Another modification is shown in connection with the compensating elastomeric seal ring 18 which, as illustrated in FIG. 2, is circular in cross-section, similar to an O-ring seal. The O-ring may be fit within a seating groove and may be secured as in FIG. 1 or may be left loose. The release disk 15 of FIG. 2 is of a slightly different cross-section than that of FIG. 1 having a smaller inner diameter.

Figure 3:
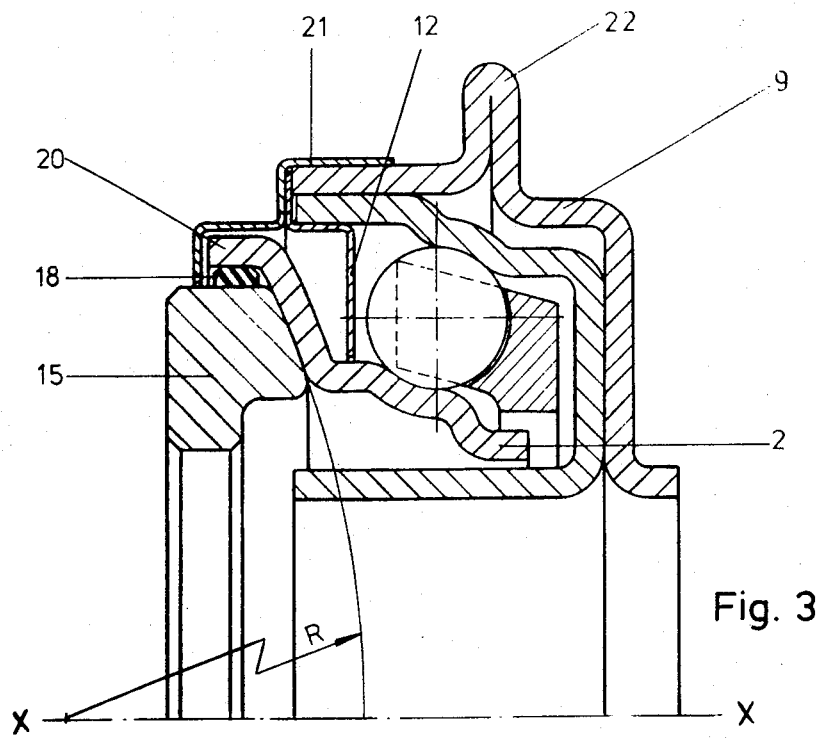

In the modification seen in FIG. 3, the release disk 15 is provided, as in FIG. 1, with a planar face directed toward the clutch coupling elements. The arrangement is suitable when the contact faces of the clutch couplings are arcuately or curvedly shaped surfaces. In this embodiment the inner ring 2 is not U-shaped but substantially Z-shaped with an upper axial leg 20 extending outwardly of the bearing toward the clutch, and enveloping the release disk 15 beyond its outer circumference. A compensating ring 18 of elastomeric material is, in this modification, inserted between the outer circumferential wall of the release disk 15 and the axial leg 20. In order to improve the sealing effect and to hold the members of the bearing together during assembly and shipment another protective cover 21 is provided in addition to the inner protective cover 12. The cover 21 is force fit over the cap 9 and is bent to overlie the cover 12 and in sealing contact, with its inner edge, the circumferential edge of the release ring 15.

Also, as seen in FIG. 3, the cap 9 may be folded to provide a bead 22 directed radially outwardly and which is adapted to be engaged by the clutch fork or other operating mechanism. This bead 22 replaces the projection 11 which may not be needed in certain instances.

In each of the forms seen in FIGS. 1 – 3 the bearing rings 1 and 2, the cap 9 may be made from sheet metal or other metal material that can be worked, bent, stamped or otherwise formed into shape. The release disk 15 may be similarly formed if desired.

Figure 4:
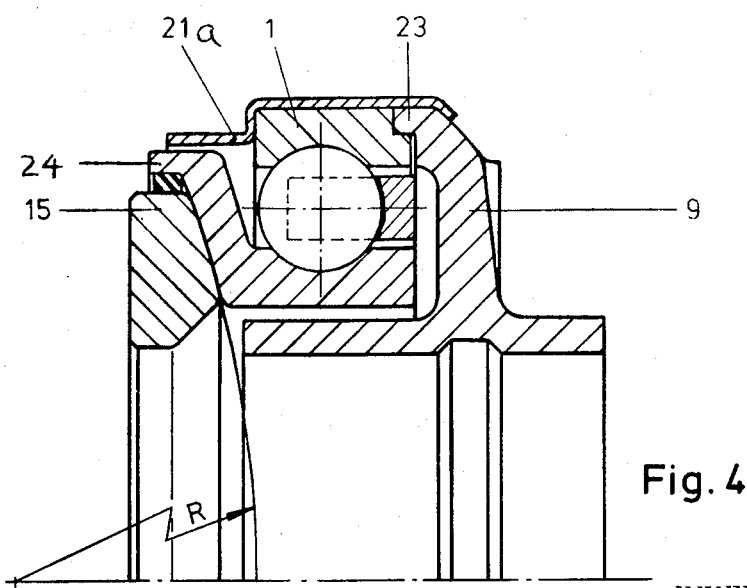

In the further construction illustrated in FIG. 4 the outer ring 1 comprises a substantially cylindrical annulus having a machined notch at its rear end (away from the clutch) into which a shoulder 23 of a cap 9 is secured. The cap 9 serves also the dual faction of forming the sleeve for the bearing and is consequently shaped in cross-section like an inverted T. The inner ring 2 is formed also in a substantially cylindrical shape having an upwardly, outwardly extending central portion and an axial leg 24 parallel to the bearing axis and circumferentially surrounding the edge of the release disk 15 in the manner shown in FIG. 3. In this embodiment, however, the rings 1 and 2, the cap-sleeve 9, and the release disk 15 are cut from solid metal stock rather than being formed of sheet material as in FIGS. 1 – 3. A protective sleeve 21a serves to seal the bearings and to hold the parts together, by fastening the cap-sleeve 9 with the outer ring 1.

In each of the foregoing forms the radius R is prechosen to provide the optimum movement of the release disk 15 and to permit its free swiveling or swing in the seat of the concave section 14 of the inner ring so that eccentric and gyrating motion is effectively compensated. Further, the overlapping of axial portions of the inner ring and the clutch release ring such as portions 16 and 17 (FIGS. 1 and 2) and 20 and 24 (FIGS. 3 and 4), enable the bearing to be made with a relatively small overall axial dimension. The interposed elastomeric ring 18 provides additional compensatory movement.

The ability to make the present invention out of either sheet metal or solid metal stock permits compensation to be made for small misalignments between the bearing and the clutch so that the bearing is truly self-centering. The ability of making the cap 9 out of sheet metal also enables the formation of various forms such as the projections 11 and the bead 22 for connection to the operating fork. This is of particular advantage when the space for the bearing in an axial direction is limited, but space in a radial direction is available.

It will be apparent that numerous modifications and changes are possible all within the scope of the present invention. Therefore, this disclosure is to be taken as illustrative and not limiting of the present invention.

What is claimed is:

1. A clutch release bearing for interposition between the clutch elements and the clutch release operating mechanism having a central axis of rotation comprising an outer race ring adapted to be connected to the clutch operating mechanism, an inner race ring, and a plurality of bearing elements located therebetween, said race rings having race surfaces lying parallel to the axis of rotation, the race surface of said inner race ring lying radially within the outer race ring, said inner ring having a radial extension, said bearing including means abutting the extension of said inner race ring and being adapted to engage the clutch elements, said engaging means and the extension of said inner race ring having correspondingly curved abutting surface permitting relative sliding movement therebetween angularly of the axis of rotation.

2. The bearing according to claim 1 wherein the means for engaging the clutch elements comprises a disk having at least one spherically curved face adapted to abut said inner race ring and a second face adapted to contact the clutch elements.

3. The bearing according to claim 2, wherein the inner race ring is formed with a concave face and said spherical abutting face of said disk is convex, the radius of curvature of the concave and convex faces being equal.

4. The bearing according to claim 2, wherein said inner race ring is formed with at least one stepped portion extending axially of said bearing and overlying at least a portion of said disk.

5. The bearing according to claim 4, including an elastic seal interposed between the overlapping portions of said inner race ring and said disk.

6. The bearing according to claim 5, wherein said disk is provided with a hub portion extending axially of said bearing corresponding to said stepped portion formed on said inner race ring.

7. The bearing according to claim 2, wherein the clutch element engaging face of said disk is curved.

8. The bearing according to claim 2, wherein the clutch element engaging face of said disk is planar.

9. A clutch release bearing for interposition between the clutch elements and the clutch release operating mechanism comprising an outer race ring adapted to be connected to the clutch operating mechanism, an inner race ring, and a plurality of bearing elements located therebetween, wherein said outer race ring is substantially U-shaped and said inner race ring is arranged within said outer race ring and including means interposed between the inner and outer race rings for slidingly sealing the same relative to each other, said bearing including means abutting the inner race ring adapted to engage the clutch elements, said engaging means and said race ring having correspondingly curved abutting surface permitting relative movement therebetween.

10. The bearing according to claim 9, including a cap secured to said outer race ring including means for engagement with said clutch release operating mechanism.

11. The bearing according to claim 10, wherein at least said cap is formed of sheet material and includes a fold forming a head comprising the means for engagement with said clutch release operating mechanism.

12. The bearing according to claim 9, wherein said outer race ring forms at least a portion of the sleeve of said bearing.

* * * * *